UNITED STATES PATENT OFFICE.

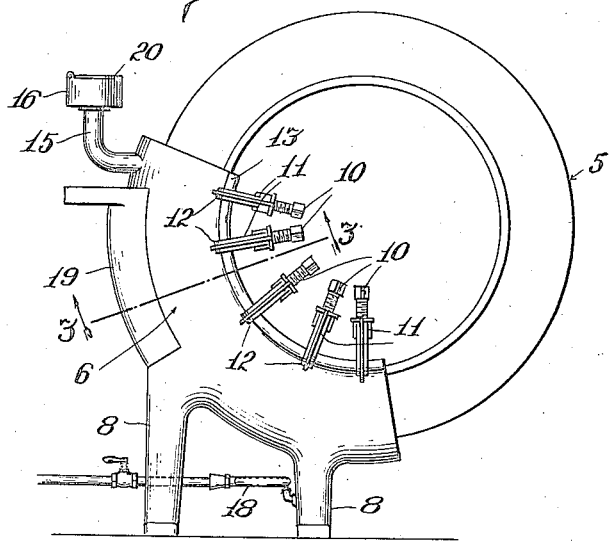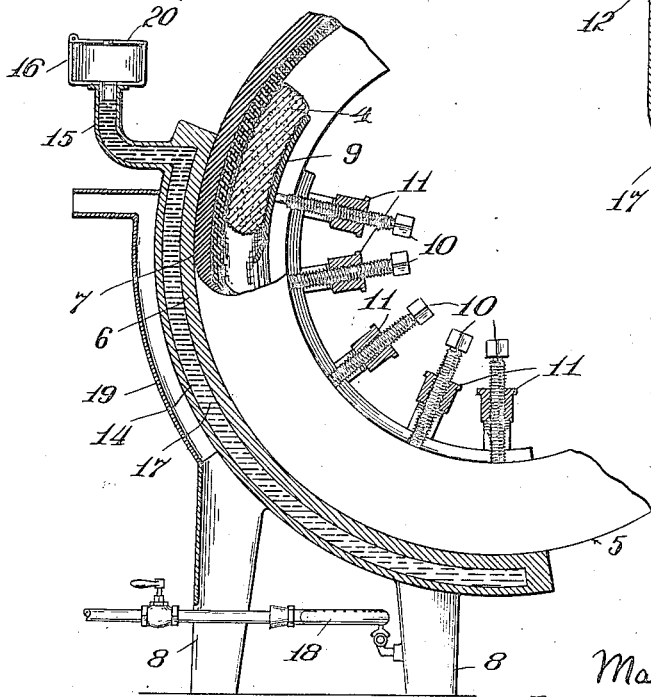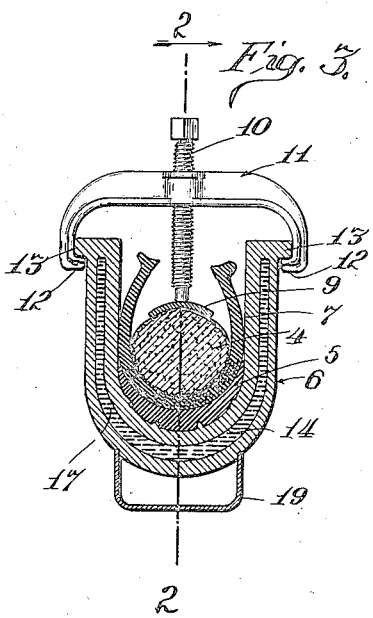

MAHLON O. KASSON, OF CHICAGO, ILLINOIS.

APPARATUS FOR VULCANIZING RUBBER ARTICLES.

1,427,109.    Specification of Letters Patent.    Patented Aug. 29, 1922.

Application filed December 5, 1921. Serial No. 519,833.

*To all whom it may concern:*

Be it known that I, MAHLON O. KASSON, a citizen of the United States, residing at Chicago, in the county of Cook and State of Illinois, have invented certain new and useful Improvements in Apparatus for Vulcanizing Rubber Articles, of which the following is a specification.

My invention relates to improved means and a novel process for vulcanizing articles containing rubber and the like, and the main object of my invention is to supply the vulcanizing heat through the medium of a liquid, which is under atmospheric pressure and has a boiling point higher than the temperature at which the vulcanization is accomplished.

My invention is peculiarly adapted for use in connection with the retreading of rubber tires for vehicles, but it is to be understood that it may be employed with equal facility for use in vulcanizing other articles containing rubber or other similar vulcanizable material.

It has long been common practice to retread tires in a mold having a closed chamber, in which steam is generated for the purpose of supplying sufficient heat to the mold to vulcanize the rubber tread onto the old tire. This old process has many serious disadvantages and defects and is extremely dangerous. The walls of the mold must be very heavy in order to withstand the high steam pressure necessary to heat the steam to the proper vulvanizing temperature, which means that they are hard to handle, and expensive to manufacture and transport. Molds of cast iron in which steam is generated, have been used but cast iron has a very low factor of safety, and especially so in molds for retreading tires, as the molds are used by men who are usually totally ignorant of steam practice. Defects in cast iron molds, which cannot in many cases be detected upon inspection, and also corrosion by the steam, have resulted in so many serious explosions, that many States have prohibited by statute their use for the generation of steam. Expensive equipment or accessories, such as safety valves, filling valves, and steam gauges, must be used in connection with steam heated molds and, at best, the gauges and valves are not reliable, which in some cases results in over-vulcanization, if not explosions, and in other cases in under-vulcanization. The apparatus also demands constant inspection and frequent refilling with water, and in winter the water may freeze and burst the mold, unless the room in which the mold is kept is heated.

My invention successfully avoids and solves the above difficulties and problems, as the liquid, used in the mold as a heating medium for supplying the temperature which effects vulcanization, is at all times under atmospheric pressure and has a boiling point higher than the vucalnization temperature, so that no pressure is exerted in the chamber and there is practically no escape of the liquid therefrom. It is therefore apparent that the mold may be made of cast iron or lighter material, such as aluminum or an alloy thereof, having a high coefficient of heat conductivity. The walls may be made much thinner, than the present cast iron molds. The extra equipment, such as valves and gauges, is dispensed with and the apparatus does not need constant attention or refilling, nor will the liquid burst the mold should it freeze.

The accompanying drawings, which form part of this specification, show for illustrative purposes, an apparatus which embodies one form of my invention and which is adapted to carry out my improved process. Of said drawings, Fig. 1 is a side elevation of the apparatus; Fig. 2 is a longitudinal section, as on the lines 2—2 of Fig. 1; and Fig. 3 is a cross section, as on the line 2—3 of Fig. 1.

For the sake of convenience and illustration, the apparatus is shown as being adapted for use in retreading vehicle tires, but, of course, it is obvious the invention may be used in connection with other types of molds and for vulcanizing other articles made wholly or in part of rubber or the like.

The tire 5 is shown mounted and clamped in the segmental mold 6, which is U-shaped in cross section to form the vulcanizing chamber 7 for the tire. The mold may be supported by the legs 8, which are preferably integral with the mold. Pressure is exerted on the tread portion and parts of the side of the tire by a sand bag 4, which is in the tire and forced against it by a metal plate 9 and screws 10, mounted in clamps 11. Noses or projections 12 on the ends of the clamps engage under flanges 13 on the mold.

Formed in the mold is a chamber 14 extending from one end of the mold to the other. Communicating with the upper end of the chamber is a pipe 15, supporting an overflow receptacle 16, the lid 20 of which is preferably hinged to it. The chamber is filled with a liquid 17 having a boiling point, which is higher than the temperature necessary for the vulcanization of the tread of the tire. I prefer to use a suitable substance, such as paraffin wax, which at ordinary temperatures in many climates is a solid and melts at a relatively low temperature, but boils at a relatively higher temperature. Such a substance is suitable as it can be easily transported and handled in solid form and at the same time would not, like water, burst the mold upon passing from its liquid to its solid state. I do not, however, wish to limit myself to such substance, as it is not essential to my invention in its broader aspect that the substance should solidify at any particular temperature so long as it boils at a temperature above the vulcanization temperature. Any oil having this necessary attribute is suitable for my purpose.

The liquid 17 in the chamber 14 is heated by a burner 18, which is preferably positioned under the mold and may be of any approved type. In order to more efficiently heat the liquid in the chamber 14, a casing 19, which conducts the heat along the tread portion of the mold, is secured to the mold in any desired manner.

From the above description it will be apparent that the burner 18 heats the liquid 17 and it, in turn, furnishes the required heat to the new tread of the tire to vulcanize it on to the tire. As the liquid has a high boiling point no gas is evolved and the liquid is uniformly heated so that it equally distributes heat to all parts of the mold in contact with the tread. The volume of the liquid may increase as the temperature rises and therefore the pipe 15 and receptacle 16 are provided to permit the excess of liquid to overflow or rise therein. The lid 20 is merely provided to keep out dirt and may be dispensed with, if desired. If the lid is used, it is preferably provided with holes so that the chamber 14 is always open to the atmosphere and the liquid therein is never under pressure (other than atmospheric pressure). This being the case no explosion can occur.

I do not intend to limit the scope of my invention in its broad aspects to any particular kind of mold or heat conducting liquid, it being obvious to those skilled in the art that various types of mold and various kinds of liquids, having high boiling points, may be used to vulcanize articles of rubber and the like, without departing from the scope and spirit of my invention, defined in the following claims.

I claim:

1. In a vulcanizing apparatus, the combination of a mold having a chamber open to the atmosphere, a liquid having a boiling point higher than the vulcanization temperature in said chamber, and means for heating said liquid to furnish the heat of vulcanization.

2. In a vulcanization apparatus, the combination of a mold having a chamber and an expansion space in communication therewith, a liquid in said chamber under atmosphere pressure therein and having a boiling temperature higher than the vulcanization temperature, and means for heating the liquid above the vulcanization temperature, the excess liquid overflowing into the expansion space.

3. In apparatus for vulcanizing articles containing rubber, the combination of a mold having a liquid chamber, an expansion space in communication therewith and a heating chamber extending along the liquid chamber, liquid in said liquid chamber, under atmospheric pressure therein and having a boiling temperature higher than the vulcanization temperature, and means for supplying heat to said heating chamber to heat said liquid above the vulcanization temperature, the liquid being permitted to rise in said expansion space.

4. In an apparatus for retreading vehicle tires, the combination of a segmental mold having a concentric chamber in its tread portion and a space above the chamber, and in communication with the chamber and atmosphere, a liquid having a boiling point above the vulcanization temperature of rubber and adapted to overflow into said space when heated, means for heating a substantial part of the outside wall of said chamber to heat the liquid, and means for applying the necessary pressure to the tread.

5. In an apparatus for retreading vehicle tires, the combination of a segmental mold having a concentric chamber in its tread portion and a space above the chamber, and in communication with the chamber and atmosphere, a liquid having a boiling point above the vulcanization temperature of rubber and a freezing point above ordinary room temperature and adapted to overflow into said space when heated, means for heating a substantial part of the outside wall of said chamber to heat the liquid to supply the vulcanizing heat, and means for applying the necessary pressure to the tread.

MAHLON O. KASSON.